(12) United States Patent
Hsieh

(10) Patent No.: US 10,675,797 B2
(45) Date of Patent: Jun. 9, 2020

(54) STAINLESS STEEL AND SYNTHETIC RESIN COMPOSITE MOLDED BODY, AND PREPARATION METHOD THEREOF

(71) Applicant: Ching-Chuan Hsieh, New Taipei (TW)

(72) Inventor: Ching-Chuan Hsieh, New Taipei (TW)

(73) Assignee: DONG GUAN QINDE METAL PRODUCTS CO., LTD., Dongguan (CN)

( * ) Notice: Subject to any disclaimer, the term of this patent is extended or adjusted under 35 U.S.C. 154(b) by 555 days.

(21) Appl. No.: 15/426,996

(22) Filed: Feb. 7, 2017

(65) Prior Publication Data

US 2018/0222097 A1     Aug. 9, 2018

(51) Int. Cl.
| | |
|---|---|
| B29C 45/14 | (2006.01) |
| C23F 17/00 | (2006.01) |
| C25F 3/06 | (2006.01) |
| C23F 1/28 | (2006.01) |
| B29C 71/02 | (2006.01) |
| B29K 81/00 | (2006.01) |
| B29K 705/12 | (2006.01) |

(52) U.S. Cl.
CPC .......... B29C 45/14311 (2013.01); C23F 1/28 (2013.01); C23F 17/00 (2013.01); C25F 3/06 (2013.01); *B29C 2045/14803* (2013.01); *B29C 2045/14868* (2013.01); *B29C 2071/022* (2013.01); *B29K 2081/04* (2013.01); *B29K 2705/12* (2013.01)

(58) Field of Classification Search
CPC .... C23F 1/28; C23F 3/06; C23F 13/02; C23F 17/00; C25F 3/06; B29C 4/14311
USPC ........................ 216/32, 87, 88, 90, 103, 104
See application file for complete search history.

(56) References Cited

U.S. PATENT DOCUMENTS

| | | | |
|---|---|---|---|
| 2012/0256224 A1* | 10/2012 | Hatanaka | ............ C23C 18/1608 257/98 |
| 2013/0092298 A1* | 4/2013 | Bregulla | ................. B24B 5/185 148/565 |
| 2013/0155580 A1* | 6/2013 | Karnik | ................. H01G 9/0029 361/508 |

(Continued)

FOREIGN PATENT DOCUMENTS

| | | |
|---|---|---|
| JP | 06-136600 | 5/1994 |
| JP | 2010-269532 | 2/2012 |
| JP | 2012-157991 | 8/2012 |

OTHER PUBLICATIONS

Wikipedia, "Iron (II) Chloride" via https://en.wikipedia.org/wiki/Iron(II)_chloride ; pp. 1-4; 2019.*

(Continued)

*Primary Examiner* — Binh X Tran

(57) ABSTRACT

A stainless steel and synthetic resin composite molded body and preparation method thereof. After the surface of the flat and even stainless steel had anchor effect, it was connected with various synthetic resin pieces by means of insertion molding. Regardless of the material of the stainless steel piece, the indenting test proved that the strength, of over 15 N/mm² after connection enabled stable tightness. With insertion molding of the stainless steel piece having anchor effect in the present invention, composite molded products comprising various resin parts can be produced if no displacement or height difference occurs.

9 Claims, 2 Drawing Sheets

(56) References Cited

U.S. PATENT DOCUMENTS

| | | | | |
|---|---|---|---|---|
| 2013/0224582 A1* | 8/2013 | Mehata | ................ | C23F 1/02 |
| | | | | 429/211 |
| 2013/0236708 A1* | 9/2013 | Moh | ................ | C23C 18/14 |
| | | | | 428/209 |
| 2013/0236732 A1* | 9/2013 | de Oliveira | ............ | C23C 18/14 |
| | | | | 428/457 |

OTHER PUBLICATIONS

Wikipedia, "Iron (III) chloride" via https://en.wikipedia.org/wiki/Iron(III)_chloride ; pp. 1-10; 2019.*

* cited by examiner

STAINLESS STEEL AND SYNTHETIC RESIN COMPOSITE MOLDED BODY, AND PREPARATION METHOD THEREOF

BACKGROUND OF THE INVENTION

1. Field of the Invention

The present invention relates generally to a one-piece stainless steel and synthetic resin composite molded body and preparation, method thereof for casing parts and internal function parts of staple merchandise, built-in and exterior parts as well as function parts of automotive. These products or parts include: external parts and internal function parts of appliance parts, such as mobile phones, smart phones, cameras, watches and clocks, stereo equipment, televisions and computers, etc. In addition, they are not only applicable to the external and functional parts, but particularly suitable for metal casing of products valuing properties of electric waves in the automobile industry in pursuit of light weight.

2. Description of Related Art

Presently, with the metal and plastic composite molded technology, porous is generally produced by processing the aluminum alloy surface and inserted into an injection mold for connection between the stainless steel and synthetic resin pieces by means of the anchor effect of the injection mold and thermoplastic resin. The applicant's previous applications of U.S. Pat. Nos. 7,841,577 and 7,919,032 as well as the JP Licensed Patent No. 4541153 are examples. However, in case of stainless steel pieces, only PPS resin is applicable, or limitations and strengths differ according to the types of stainless steel pieces. Therefore, the present invention has not been promoted or publicized from development till now. In addition, in the past, when stainless steel pieces were connected with multiple resins, they were usually connected with duplicated films and adhesive, leading to poor outcomes due to frequent displacement and height difference.

Among current studies on stainless steel and synthetic resin complex, although TaiseiPlas, a Japanese company, has developed the surface treatment method based on the nano molding technology (NMT), the fine etching method requires control over degradation of etchant to ensure stable strength. Further, there are various limitations in selection of synthetic resin pieces. Hence, there are a number of problems to solve. Additionally, although Sumitomo Metal Mining Co., Ltd., another Japanese company, has the leading invention and technology of metal surface coarsening by electrolysis in nitrate electrolyte to improve the coating tightness, the tightness strength of the inserted molded PBT only reaches approximately 6 N/mm2, which is apparently insufficient. Therefore, such method still needs improvement.

PRIOR ARTS

JP 2012-157991
JP 2010-269532
JP 1994-136600

SUMMARY OF THE INVENTION

In the existing methods, only austenitic stainless steel can be used and there are limited options of synthetic resin pieces, which fails to achieve stable tightness between stainless steel and synthetic resin pieces. Therefore, the present invention provides an unrestricted stainless steel material. Upon the indenting test with synthetic resin pieces, it was proved that such stainless steel material has high stability. With such material, the complex showing high strength of 15 N/mm$^2$ is produced and the preparation method is given.

BRIEF DESCRIPTION OF THE SEVERAL VIEWS OF THE DRAWING(S)

DETAILED DESCRIPTION OF THE INVENTION

Figure 1:
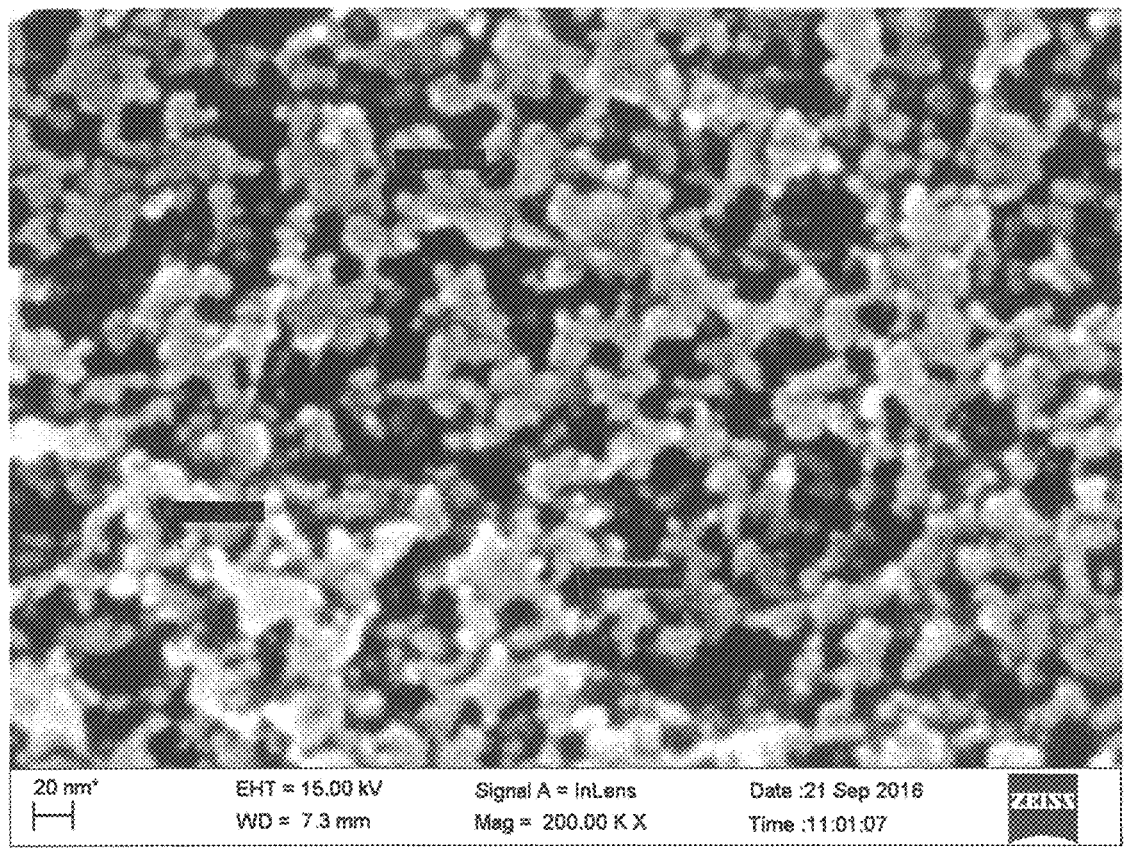
FIG. 1 is a SEM diagram of Embodiment 1 of stainless steel 316 in surface treatment; after fine surface coarsening, it was detected that porus at the diameter of approximately 30 nanometers was distributed evenly on one side of the stainless steel surface.
Figure 2:
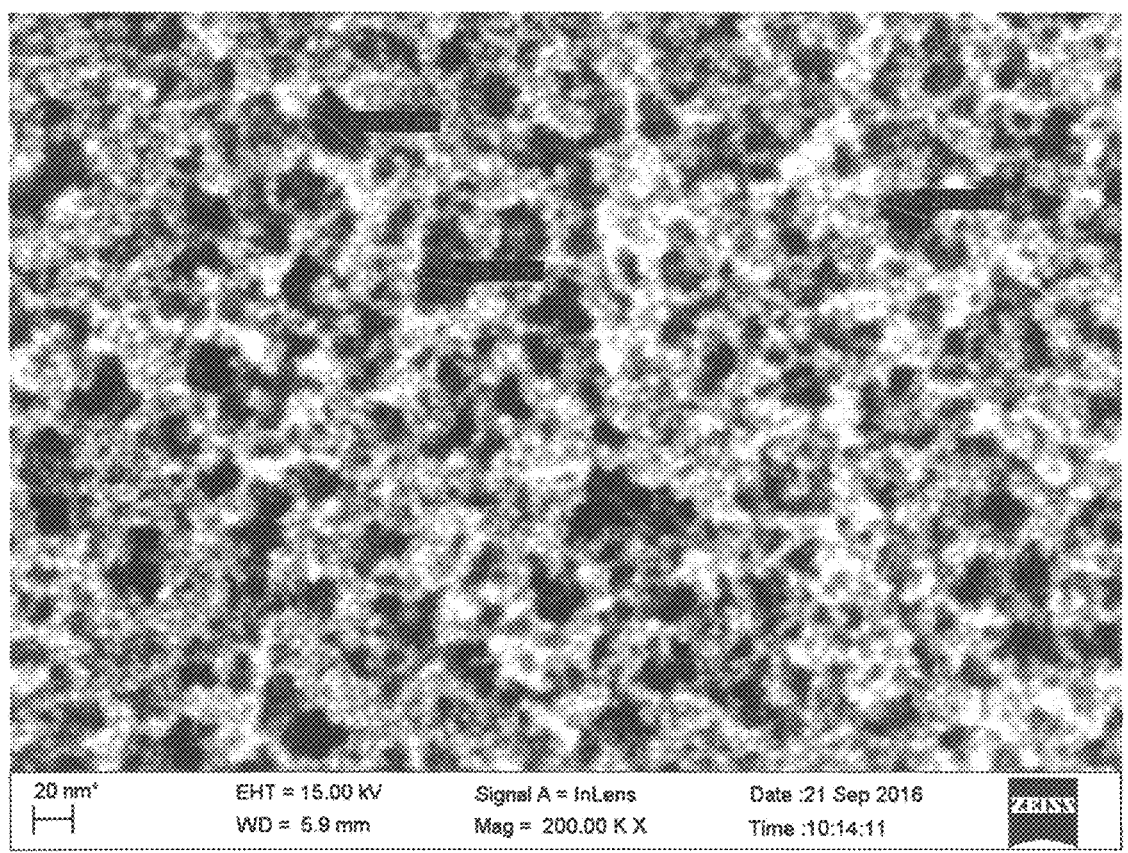
FIG. 2 is a SEM diagram of Embodiment 7 of stainless steel 304 in surface treatment; after fine surface coarsening, porus at the diameter of approximately 30 nanometers were detected on one side of the stainless steel.

The present invention relates to a stainless steel and synthetic resin composite molded body, of which the structure comprises: a stainless steel piece and a synthetic resin piece anchored in and bonded to the stainless steel piece as one piece with an injection molding method.

The stainless steel is an austenitic stainless metal piece with one surface thereof having a plurality of nanoscopic micropores that has received electrolysis, passivating and dedusting, and another surface of the stainless steel, piece is an exposed portion which is not joined to the synthetic resin piece, wherein the exposed portion is finished by finishing process to form an optimal appearance; the synthetic resin piece lacing fee surface having the plurality of nanoscopic micropores of the stainless steel piece is an integrally-joined surface; the integrally-joined surface includes a plurality of anchor portions distributed and joined in the surface having the plurality of nanoscopic micropores of the stainless steel piece.

The nanoscopic micropores of the stainless steel piece have a pore diameter of 15 to 50 nm and a depth of 100 to 1,000 nm. The nanoscopic micropores are provided, and then anchored and joined to the synthetic resin piece.

The preparation method of the stainless steel and synthetic resin composite molded body is as follows:

The stainless steel piece and the synthetic resin piece are processed into a shape to be joined to each other by means of press forming, CNC cutting, forging, and casting; the surface roughness of the stainless steel piece is not particularly limited.

Then, it requires a suspension jig in the electrolytic process of the stainless steel piece and the synthetic resin piece. Although the suspended jig is optional and industrial materials such as aluminum, stainless steel, and titanium are applicable, considering the consumption of jig, the titanium should be adopted. Due to the rapid consumption of subsequent electrolysis, it is not possible to continuously use aluminum and stainless steel.

Followed is the degreasing operation, to remove the grease on me surface of the processed stainless steel piece. No specific restrictions were imposed in respect of fee degreasing operation. The degreasing operation is not particularly limited to the use of a surface active agent, pickling, electrolytic degreasing, and the like, as long as the manner in which the surface grease can be suitably removed is selected. According to the types of degreasing materials, after degreasing for approximately 10 minutes, periodic rinsing with water is adopted to remove the residual degreaser from the surface and prevent the degreasing liquid being brought to the following procedures after degreasing.

Then, ferrous chloride as the main content of the electrolytic solution is used to electrolyze the degreased product. The electrolysis method uses the PR electrolysis (alternation) method. The negative pole is carbon. Although stainless steel is applicable, the main content of the electrolytic solution is ferrous chloride, it is easy to dissolve spontaneously or during electrolysis to increase the frequency of alternation. Moreover, from the economic perspective, carbon is a better option as negative pole.

The electrolytic solution is mainly composed of ferrous chloride at a concentration of 0.3 to 3 Mol/L, even if it exceeds 3 Mol/l, no change in coarsening and cavity is observed due to increase of ferrous chloride concentration.

The oxidizing compounds can be added to the electrolytic solution, when the stainless steel piece is soaked in ferric chloride solution, cavities will be appeared on the surface of the stainless steel piece due to cavitation made by chloride ion of the ferrous chloride.

With cavitation, the ferric iron became ferrous iron through oxidation and produce sediment due to hydrolysis of solution. During mass production, oxides were added to restrain production of sediment. In addition, such oxides were used for controlling the coarsening and size of porous, which, in the meanwhile, were essential elements for the stability of nano coarsening status and implementation of the overall treatment of the indispensable elements.

The oxidizing compounds could be manganate, dichromate, nitric acids, peroxides and sulfuric acids, with the ideal volume of addition of 0.3 Mol/L~2 Mol/L.

The temperature of the electrolytic solution is preferably room temperature (approximately 25° C.) to 60° C. In respect of economic benefits, 30-45° C. is more preferable because when the liquid temperature is higher than 43° C., the liquid concentration and stability would be changed due to evaporation and became difficult to control.

The PR electrolysis uses a constant voltage method. The positive electrolytic voltage is 1V-6V (0.5 A-4 A/dcm) while the negative electrolytic voltage is 0.1V-3V, The coarsening and cavity status differed according to the type of stainless steel, piece. Therefore, proper voltage should be determined before treatment.

The present invention was provided on the basis of using titanium jig for production. When the applied positive voltage and the negative voltage are higher than such voltage, the coarsening film of the titanium jig would be damaged, resulting in high, streaming current of the jig, which not only had significant impacts on coarsening and cavity, but led to waste of electricity from the economic perspective.

The frequency is preferably 0.5 to 7 Hz, and the Duty is preferably 30 to 95%. If the frequency is too large, the coarsening time is reduced due to the chloride ions, so that effective coarsening and porosity cannot be generated. In addition, If the frequency is lower than 0.3 Hz, it will extend the coarsening time, and expand the coarsening and porous, and affect the overall, dissolution.

The electrolytic treatment time is preferably 60 seconds to 300 seconds. If the process lasted no longer than 60 seconds, the frequency of positive voltage would be reduced. In other words, the porosity would be reduced, which would result in poor strength and stability. On the other hand, although there was no difference in strength when the electrolytic treatment process lasted for over 300 seconds, it would cause significant, economic lost.

After the electrolytic treatment and rinsing with water, the product is soaked in the nitric acid solution with the concentration of 15-45% at approximately 40° C. for 1 minute or so for coarsening treatment.

After coarsening treatment and rinsing with water, place the product in a sink at room temperature 25° C. to 60° C. for ultrasonic cleaning. At this time, the product should be washed for over 30 seconds to remove impurities and coal dust adhering to the surface of the product during electrolysis. Then, pure water should, be applied to rinse the product before drying the product at approximately 80° C. for 10 minutes or so to ensure a dry surface.

The stainless steel piece after surface treatment, should be inserted into the injection molding mechanism before joined to resin.

The synthetic resin piece comprises polypropylene, polyethylene, polyethylene terephthalate, polyacetal, polycarbonate, polyphenylene sulfide and liquid crystal polymer, etc. One or more thermoplastic resins should be selected.

Considering the contraction of resins alter molding, the difference in coefficients of linear expansion between the padding and the stainless steel piece should, be over 10%, 50% would be preferable.

Before injection molding, the selected synthetic resin should be dried at 150° C. for over 3 hours. Shorter drying process would cause poor tightness and strength, after injection molding. Additionally, the temperature, pressure, speed, and sustaining pressure of the injection nozzle should be subject to the recommended conditions of resin manufacturers. Although the temperature of molding varied according to different types of resins, the molding temperature of PBT and PPS resins are generally 140-165° C. Therefore, the molding temperature should be set based on the solution temperature of resins.

Stress is produced due to difference in coefficients between the molding contraction and linear expansion alter the stainless steel piece and the synthetic resin piece connected by means of injection molding and cooled at room temperature. Then, annealing is adopted at 150° C. for over 1 hour to eliminate such stress and further reduce or eliminate all stresses.

After annealing of the connected stainless steel and resin pieces, in order to maintain an plat: and even surface, physical treatments such as CNC processing, polishing and sandblasting (also known as hair line), or chemical treatments such as electrolytic grinding, anodic oxidation (with sulfuric acid, oxalic acid or phosphoric acid) and etching with fluoric acid or ferric chloride, etc. could be adopted to polish the surface.

After polishing the product surface, electrolysis, vacuum evaporation and PVD (physical vacuum evaporation) were adopted for fine processing in the end.

Embodiment 1

10 samples were prepared according to the following conditions.
Stainless steel material 316 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperature | Treatment time |
| --- | --- | --- | --- | --- | --- |
| 2.6 V | 0.7 V | 1.5 Hz | 50% | 30° C. | 150 s |

Embodiment 2

10 samples were prepared according to the following conditions.
Stainless steel material 316 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 6 V | 2 V | 0.75 | 50% | 40° C. | 50 s |

Embodiment 3

10 samples were prepared according to the following conditions.
Stainless steel material 316 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 0.8 V | 0.1 V | 0.75 | 50% | 40° C. | 150 s |

Embodiment 4

10 samples were prepared according to the following conditions.
Stainless steel material 316 sheet, thickness: 1 mm
Injection molding resin material Poly plastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 2.6 V | 0.7 V | 1.5 Hz | 50% | 30° C. | 150 s |

Embodiment 5

10 samples were prepared according to the following conditions.
Stainless steel material 316 sheet, thickness: 1 mm
Injection molding resin material Polyplastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 2.6 V | 0.7 V | 1.5 Hz | 50% | 30° C. | 50 s |

Embodiment 6

10 samples were prepared according to the following conditions.
Stainless steel, material 316 sheet, thickness: 1 mm
Injection molding resin material Polyplastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 7 V | 0.7 V | 1 Hz | 50% | 30° C. | 150 s |

Test method
Use the Shimadzu stretching tester for indenting test, and measure the force (N/mm2) in destruction.
Test results

| | Embodiment 1 | Embodiment 2 | Embodiment 3 | Embodiment 4 | Embodiment 5 | Embodiment 6 |
|---|---|---|---|---|---|---|
| 1 | 18.66 | 15.32 | 13.86 | 19.88 | 16.22 | 12.25 |
| 2 | 16.98 | 14.22 | 12.67 | 21.23 | 15.23 | 13.58 |
| 3 | 17.82 | 12.36 | 5.2 | 20.21 | 13.54 | 16.86 |
| 4 | 19.21 | 10.53 | 16.31 | 22.35 | 14.67 | 3.78 |
| 5 | 17.68 | 16.38 | 11.35 | 19.89 | 19.22 | 9.56 |
| 6 | 17.26 | 9.54 | 9.81 | 21.22 | 21.21 | 11.38 |
| 7 | 18.52 | 16.87 | 11.56 | 21.85 | 13.56 | 14.32 |
| 8 | 18.75 | 13.21 | 12.22 | 20.99 | 18.23 | 14.21 |
| 9 | 18.26 | 12.26 | 5.9 | 21.23 | 13.34 | 8.26 |
| 10 | 17.58 | 8.24 | 9.55 | 19.85 | 10.08 | 5.56 |
| Mean value | 18.07 | 12.89 | 10.84 | 20.87 | 15.53 | 10.98 |
| Standard deviation | 0.72 | 2.88 | 3.40 | 0.88 | 3.28 | 4.15 |
| Max. | 19.21 | 16.87 | 16.31 | 22.35 | 21.21 | 16.86 |
| Min. | 16.98 | 8.24 | 5.2 | 19.85 | 10.08 | 3.78 |
| Evaluation | ○ | x | x | ○ | x | x |

The minimum value of Embodiment 1 and Embodiment 4 both exceeded 15 N. Based on the forecast: minimum value of standard deviation (mean value: −3σ), Embodiment 1 is at least 15.91 while Embodiment 4 is at least 18.27 and has the strength of over 15 N. (FIG. 1) is the SEM diagram after treatment according to the conditions of Embodiment 1.

Embodiments 2, 3, 5, and 6 had low mean values and huge differences. Hence, it is difficult to guarantee fee strength of 15 N/mm2, Presumably, the time of treatments was short or the positive and negative voltage was too high or too low.

Embodiment 7

10 samples were prepared according to the following conditions.
Stainless steel material 304 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperature | Treatment time |
|---|---|---|---|---|---|
| 1.9 V | 1.1 V | 1.5 Hz | 55% | 30° C. | 150 s |

Embodiment 8

10 samples were prepared according to the following conditions.
Stainless steel material 304 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperature | Treatment time |
| --- | --- | --- | --- | --- | --- |
| 1.9 V | 1.1 V | 1.5 Hz | 55% | 30° C. | 50 s |

Embodiment 9

10 samples were prepared according to the following conditions.
Stainless steel material 304 sheet, thickness: 1 mm
Injection molding resin material Toray PBT 1101
Liquid ferrous chloride 1 mol/L Oxidizing agent 1 mol/L
PR electrolytic conditions

| Positive voltage | Negative voltage | Frequency | Duty | Liquid temperatare | Treatment time |
| --- | --- | --- | --- | --- | --- |
| 0.9 V | 1.1 V | 1.5 Hz | 55% | 30° C. | 50 s |

Embodiment 10

10 samples were prepared according to the following conditions.
Stainless steel material 304 sheet, thickness: 1 mm
Injection molding resin material Polyplastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
| --- | --- | --- | --- | --- | --- |
| 2.3 V | 1.5 V | 2 Hz | 55% | 30° C. | 150 s |

Embodiment 11

10 samples were prepared according to the following conditions.
Stainless steel material 304 sheet, thickness: 1 mm
Injection molding resin material Polyplastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
| --- | --- | --- | --- | --- | --- |
| 6 V | 0.1 V | 2 Hz | 55% | 30° C. | 150 s |

Embodiment 12

10 samples were prepared according to the following conditions.
Stainless steel material 304 sheet, thickness: 1 mm
Injection molding resin material Polyplastic PPS 1135
Liquid ferrous chloride 1 mol/L Oxidizing agent 1 mol/L
PR electrolytic conditions

| Positive voltage | Negative voltage | Frequency | Duty | Liquid temperature | Treatment time |
| --- | --- | --- | --- | --- | --- |
| 2 V | 3.5 V | 2 Hz | 55% | 30° C. | 150 s |

Test method
Use the Shimadzu stretching tester for indenting test and measure the force (N/mm$^2$) in destruction.
Test results

| | Embodiment 7 | Embodiment 8 | Embodiment 9 | Embodiment 10 | Embodiment 11 | Embodiment 12 |
| --- | --- | --- | --- | --- | --- | --- |
| 1 | 19.78 | 16.65 | 8.5 | 22.38 | 13.39 | 5.6 |
| 2 | 18.85 | 14.85 | 9.78 | 20.98 | 15.28 | 8.35 |
| 3 | 20.22 | 13.38 | 5.53 | 21.69 | 16.66 | 6.65 |
| 4 | 20.36 | 17.25 | 12.28 | 19.61 | 11.29 | 8.26 |
| 5 | 19.25 | 15.58 | 10.33 | 21.26 | 13.33 | 4.58 |
| 6 | 18.99 | 13.89 | 10.56 | 21.38 | 8.54 | 2.26 |
| 7 | 20.32 | 18.02 | 6.23 | 20.26 | 10.29 | 2.68 |
| 8 | 20.61 | 16.21 | 4.48 | 21.89 | 5.58 | 7.98 |
| 9 | 18.95 | 12.28 | 11.83 | 21.61 | 12.25 | 6.36 |
| 10 | 19.78 | 16.33 | 7.78 | 21.98 | 15.33 | 8.23 |
| Mean value | 19.71 | 15.44 | 8.73 | 21.30 | 12.19 | 6.10 |
| Standard deviation | 0.66 | 1.82 | 2.68 | 0.83 | 3.39 | 2.29 |
| Max. | 20.61 | 18.02 | 12.28 | 22.38 | 16.66 | 8.35 |
| Min. | 18.85 | 12.28 | 4.48 | 19.61 | 5.58 | 2.26 |
| Evaluation | ○ | x | x | ○ | x | x |

Embodiment 7 and Embodiment 10 had stable mean values and the values of standard deviation were below 1. Hence, these two embodiments have the stability for mass production.

Presumably, Embodiments 8, 9, 11, and 12 felled to produce normal coarsening and porus because the time of treatments was short or the positive and negative voltage were too low or too high.

The above only describes the preferable embodiments of the present invention. It should be indicated that those skilled in the art may also make various modifications and improvements without departing from the spirit of the present invention, which shall all be deemed within the protection scope of the present invention.

I claim:
1. A preparation method of stainless steel and synthetic resin composite molded body, comprising:
   (1) degreasing and washing steps:
      degreasing and washing an austenitic stainless steel piece made by press forming, computer numerical control cutting, forging and casting to remove a surface grease thereof;
   (2) electrolyzing step:
      performing periodic reverse alternation electrolysis using an electrolytic solution containing ferrous chloride as a main content for roughening and making porosities on the surface of the stainless steel piece, and then washing the ferrous chloride solution adhered thereon after roughening and making porosities;

(3) coarsening step:
soaking the stainless steel piece in nitric acid solution after the roughening so as to make the surface thereof appear coarsening state;

(4) dedusting step:
removing and washing coal dust remaining on the surface of stainless steel piece by ultrasonic cleaning after the coarsening treatment;

(5) injection step:
inserting the stainless steel, piece after completion of the dedusting treatment into an injection molding die, and joining the stainless steel piece and synthetic resin piece to form a composite molded body by an anchoring effect;

(6) annealing step:
performing an annealing treatment on the composite molded body to reduce or remove the stress caused by the difference in an expansion coefficient of the synthetic resin and the stainless steel piece;

(7) polishing step:
performing a polishing treatment on a rough surface of the composite molded body by electrolytic grinding, or etching with fluoric acid or ferrous chloride;

(8) finishing step:
performing a partial finishing process on an exposed portion of the stainless steel piece which is electrically conductive and is not joined to the synthetic resin piece.

2. The preparation method of stainless steel and synthetic resin composite molded body according to claim 1, wherein the annealing step further comprises a cutting step thereafter to polish joining surfaces of the stainless steel piece and the synthetic resin by cutting treatment.

3. The preparation method of stainless steel and synthetic resin composite molded body according to claim 1, wherein the synthetic resin piece comprises at least one of the following: polypropylene, polyethylene, polyethylene terephthalate, polyacetal, polycarbonate, polyphenylene sulfide, and liquid crystal polymer.

4. The preparation method of stainless steel and synthetic resin composite molded body according to claim 1, wherein the electrolytic solution is mainly composed of ferrous chloride at a concentration of 0.3 to 3 Mol/L; the oxidizing compounds is added to the electrolytic solution, when the stainless steel piece is soaked in ferrous chloride solution, porosities will be appeared on the surface of the stainless steel piece due to cavitation made by chloride ion of the ferrous chloride: the amount of the oxidizing compound to be added to the electrolytic solution is from 0.3 mol/L to 2 mol/L.

5. The preparation method of stainless steel and synthetic resin composite molded body according to claim 1, wherein the periodic reverse alternation electrolysis uses a constant voltage method; the temperature of the electrolytic solution is room temperature 25 to 60° C.; the frequency is 0.5 to 7 Hz; the Duty is 30 to 95%; and the electrolysis treatment time is 60 to 300 seconds.

6. The preparation method of stainless steel and synthetic resin composite molded body according to claim 1, wherein the coarsening step is that the stainless steel piece is soaked in the nitric acid solution with the molar concentration of 15-45% at approximately 40° C. for 1 minute.

7. The preparation method of stainless steel and synthetic resin composite molded body according to claim 1, wherein the dedusting step is that the stainless steel piece is at room temperature 25° C. to 60° C. for ultrasonic cleaning over 30 seconds.

8. The preparation method of stainless steel and synthetic resin composite molded body according to claim 1, wherein the synthetic resin is dried at a temperature of 150° C. for more than 3 hours before injection molding to avoid the decrease in the adhesion strength after the injection molding.

9. The preparation method of stainless steel and synthetic resin composite molded body according to claim 1, wherein the stainless steel piece and the synthetic resin piece that were joined by injection molding were cooled at room temperature and then subjected to an annealing treatment at 150° C. for 1 hour or longer to remove stress.

* * * * *